United States Patent [19]

Page et al.

[11] 4,430,704
[45] Feb. 7, 1984

[54] PROGRAMMABLE BOOTSTRAP LOADING SYSTEM

[75] Inventors: Robert E. Page; Raymond B. Brackett, both of San Diego, Calif.

[73] Assignee: The United States of America as represented by the Secretary of the Navy, Washington, D.C.

[21] Appl. No.: 113,875

[22] Filed: Jan. 21, 1980

[51] Int. Cl.³ .............................................. G06F 9/24
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,321,747 | 5/1967 | Adamson | 364/200 |
| 3,909,790 | 9/1975 | Shariro et al. | 364/200 |
| 3,940,744 | 2/1976 | Mock et al. | 364/200 |
| 3,943,493 | 3/1976 | Shelton | 364/200 |
| 3,944,984 | 3/1976 | Morley et al. | 364/900 |
| 4,030,073 | 6/1977 | Armstrong, Jr. | 364/200 |
| 4,051,326 | 9/1977 | Badagnani | 364/900 |
| 4,067,059 | 1/1978 | Derchak | 364/200 |
| 4,131,942 | 12/1978 | Gillett | 364/200 |
| 4,150,429 | 4/1979 | Ying | 364/200 |
| 4,180,855 | 12/1979 | Buedel | 364/200 |
| 4,181,936 | 1/1980 | Kober | 364/200 |
| 4,204,208 | 5/1980 | McCarthy | 364/900 |
| 4,244,032 | 1/1981 | Oliver | 364/900 |

Primary Examiner—James D. Thomas
Assistant Examiner—David Y. Eng
Attorney, Agent, or Firm—Robert F. Beers; James O. Skarsten; Thomas Glenn Keough

[57] ABSTRACT

A programmable bootstrap loader device for loading or transferring programs into the main memory of a computer system includes a processor-peripheral interface for decoding instructions of the computer system and for generating control signals to operate peripheral equipment coupled to the system. An alterable or programmable memory stores a set of instructions which makes up a bootstrap loader program, is not lost when power to the system is shut off. An alterable memory access circuit is coupled between the processor-peripheral interface and the alterable memory to enable an operator to alter discrete instructions of the stored bootstrap loader program.

4 Claims, 11 Drawing Figures

PROGRAMMABLE BOOTSTRAP LOADING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention disclosed and claimed herein pertains generally to bootstrap loader programs and associated equipments for use in a computer system to enable changing or alteration of discrete program instructions. The invention further pertains to bootstrap loader equipment which is nonvolatile, i.e., which retains a bootstrap program when the computer system power is turned off that otherwise erases all software stored in the system's main memory.

A data processing or computer system performs specified functions by storing a number of programs in a system main memory, and appropriately directing a system central processing unit (CPU). Consequently, a procedure is included in the initialization of the computer system for entering a bootstrap loader into the system main memory. Since a bootstrap loader is a program which directs the CPU to load other programs into a main memory from floppy discs, magnetic tape, or like sources, all system software except the bootstrap program is automatically loaded by routine CPU operation.

In a number of conventional systems, a bootstrap loader program is entered into a main memory by means of a keyboard or a paper tape reader/punch. For example, to enter a bootstrap program into the main memory of a minicomputer such as the Varian V73, a high speed paper tape reader is coupled to the I/O bus and a bootstrap loader control in the CPU is energized. The hard-wired load control is capable of generating enough control signals, the bootstrap loader program, to cause successive instructions on the tape to be read off the tape and into the main memory.

A readily apparent disadvantage of the above conventional procedure is a relatively expensive paper tape peripheral device whether or not such device has any other use in the computer system operation. Also, since a paper tape reader is an electro-mechanical device having many moving parts and a slow rate of operation time is lost from computer operation. A further disadvantage in a paper tape bootstrap loader system is its vulnerability to a main memory power loss that erases all software, including any previously entered bootstrap loader program, is from the main memory. Additional time is then lost in reinitializing the main memory by means of a paper tape reader.

In order to overciome the above volatility problem, a prior art device includes a set of fixed or "hard-blown" read only memories (ROMs) configured to have a particular bootstrap program that is invulnerable to a main memory or system power loss. However, changing even a single instruction in the set program takes hours of time to obtain and substitute new ROM's.

Through their invention, the Applicants provide a programmable or alterable bootstrap loader peripheral device. This device can be employed with any conventional data processing or computer system to rapidly enter a bootstrap program into a system main memory, without needing a paper tape or a fixed ROM. The invention allows particular instructions included in the bootstrap program to be quickly and simply altered before or after the program is entered into the main memory. At the same time, the bootstrap loader device of Applicants' invention retains a nonvolatile bootstrap program viable after power is shut off to enable a later, rapid re-initialization of a computer system.

SUMMARY OF THE INVENTION

A programmable bootstrap loader apparatus is provided for loading or entering software into the main memory of a computer system. The apparatus includes a computer processor-peripheral interface means for decoding instructions generated by the processor or CPU of the system and also for generating control signals which operate peripheral equipment coupled to the system. The apparatus further includes alterable memory means for storing a bootstrap loader program and alterable memory access means coupled between the processor-peripheral interface and the alterable memory for selectively altering discrete instructions of the stored bootstrap loader program.

Preferably, the alterable memory access means has a means for reading some or all of the instructions making up a bootstrap loader program from the alterable memory into the main memory in response to a single instruction provided by the processor. Consequently, the bootstrap program may be transferred into the main memory very rapidly. Preferably also, the alterable memory means includes a non-volatile storage means so that a stored bootstrap loader program is unaffected when the computer system loses its power and is available for rapid re-initialization of the computer system when power is restored.

In a preferred embodiment, the alterable memory means has a number of selectively configured alterable or programmable ROM devices for storing bootstrap loader program instruction data. The memory access means for this embodiment includes read and write mode controls for determining whether data is to be written into or read out of the alterable memory. The memory access means further includes alterable memory address, data, and internal controls, which are respectively responsive to signals generated by the read and write mode controls.

As an alternative, the present invention includes a computer system which includes a CPU, a main memory, first and second peripheral devices, and a means for interconnecting the CPU, memory and peripherals. The first peripheral device is a storage disc or magnetic tape device, from which programs or other software may be read into the main memory by the CPU when the main memory contains a bootstrap loader program for directing the CPU. The second peripheral device includes alterable or adjustable firmware apparatus which is structured to contain the bootstrap loader program. The CPU includes hard-wired means for reading the bootstrap program out of the second peripheral and into main memory when the computer system is initialized.

OBJECTS OF THE INVENTION

An important object of the present invention is to significantly reduce the time required to load programs or other software into the main memory of a computer system by means of a bootstrap loader.

Another object is to retain a bootstrap loader program for a computer system in a form which is unaffected when power is cut off from the computer system, and which enables required software to be rapidly loaded or reloaded into system main memory when power is restored.

Another object is to provide a bootstrap loader system which achieves the above objectives, and which additionally enables individual instructions of a bootstrap program to be frequently and simply varied or altered.

Another object is to eliminate the need for a paper tape reader, or other electromechanical peripheral device, in a bootstrap loader system.

These and other objects of the invention will become more readily apparent from the ensuing specification when taken together with the drawings.

DETAILED DESCRIPTION OF THE PREFERRED EMBODIMENT

Figure 1:
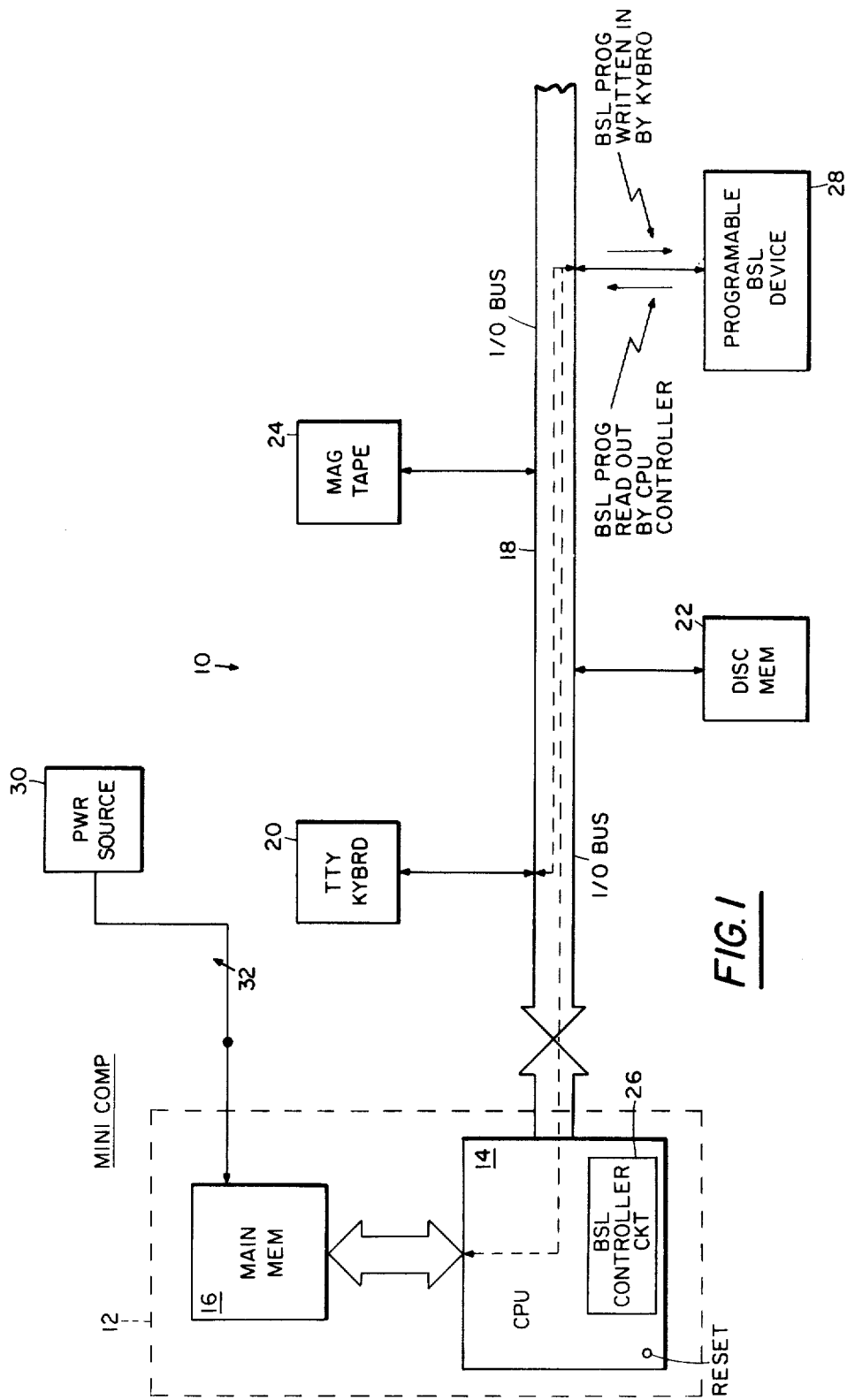
FIG. 1 is a block diagram showing an embodiment of the invention employed in a data processing or computer system.

Referring to FIG. 1, a data processing or computer system 10 includes a minicomputer 12, such as the Varian V73. The minicomputer is provided with a central processing unit (CPU) 14 and a main memory 16 for solving problems or for performing other data processing tasks under the direction of various programs stored in main memory 16. An input/Output bus 18 also is included in the computer system to enable data transfer between the minicomputer and peripheral devices such as a keyboard 20, disc memory 22 or magnetic tape deck 24 which may be employed in the computer system.

When the minicomputer performs a task according to a particular program, the minicomputer is initialized by entering a bootstrap loader program into main memory 16. CPU 14 then is operated under the direction of the bootstrap loader program to load the particular program or programs into the main memory from one of the peripheral storage devices such as a floppy disc of disc memory 22 or a magnetic tape of tape deck 24.

The bootstrap loader program is entered into the main memory of the minicomputer, such as a Varian V73, by providing the CPU with a bootstrap loader circuit 26. Circuit 26 includes a hardwired controller that is energized by a manual reset to generate control signals which are capable of directing successive bootstrap program instructions from a high speed paper tape reader into the main memory. However, in order to eliminate the need for a paper tape reader a programmable bootstrap loader device 28 is coupled to I/O bus 18. The bootstrap loader device 28 is structured so that successive instructions making up a bootstrap loader program, may be entered by an operator by means of a keyboard 20, through CPU 14. A typical bootstrap program may include 64 discrete 16-bit length instructions and of the instruction format of minicomputer 12. When controller bootstrap loader circuit 26 is energized, an instruction for operating device 28 reads out the bootstrap loader program into main memory 16 and couples it to device 28 through I/O bus 18.

Referring further to FIG. 1, a power source 30 is coupled through a switch 32 to provide the power requirements of each of the elements of computer system 10 including the power requirements of main memory 16. When the main memory loses power, either because of a deliberate opening of switch 32 or unexpected failure of power source 30, all stored software including the bootstrap loader program, is erased; however, the bootstrap loader program continues to be stored in programmable bootstrap loader device 28, and may be quickly reentered into the main memory by once again energizing bootstrap loader circuit 26.

While the bootstrap program stored in loader device 28 is unaffected by power loss, an operator may change a particular instruction simply by depressing the appropriate keys of keyboard 20.

Figure 2:
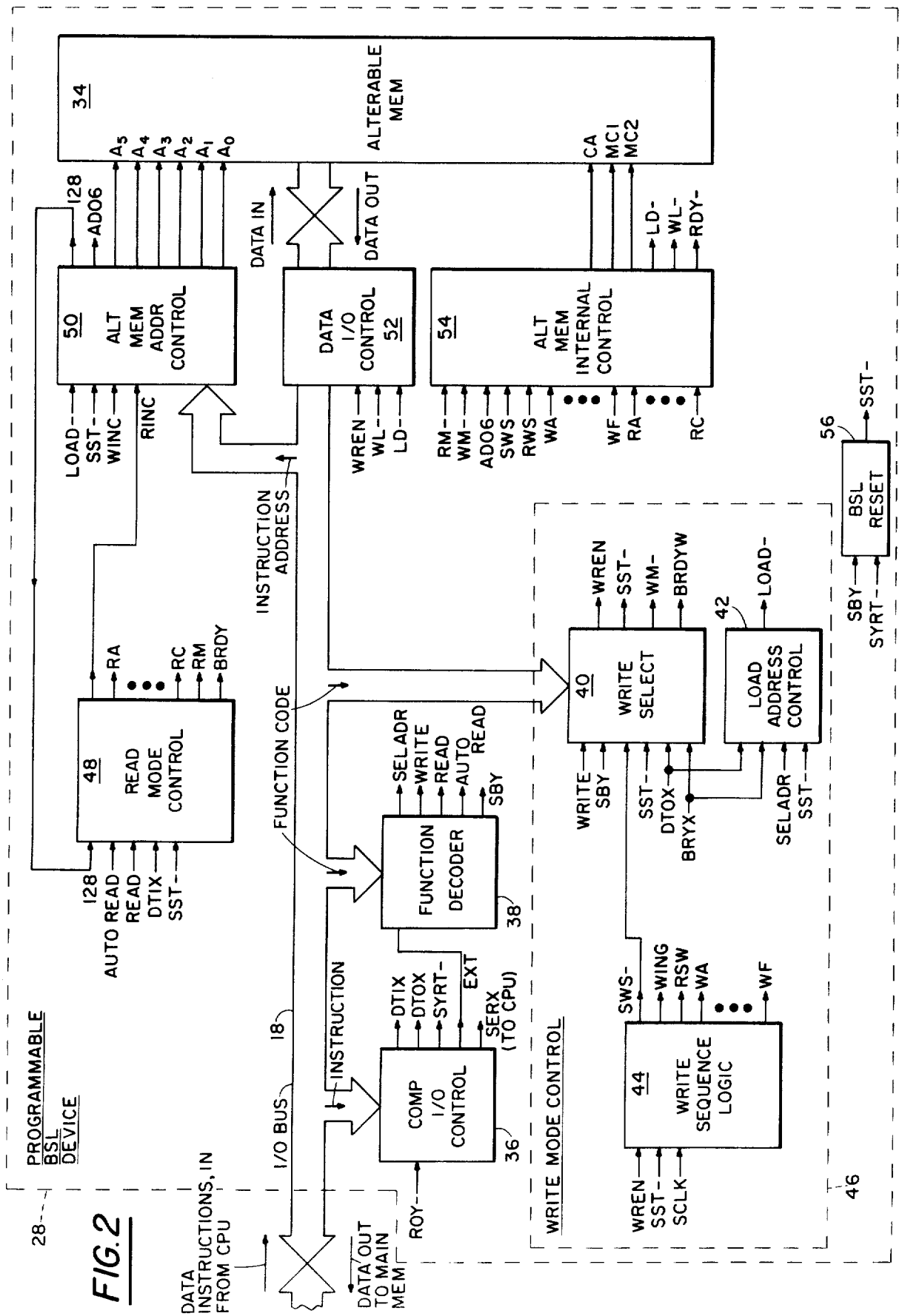
FIG. 2 is a block diagram showing the embodiment of the invention employed in FIG. 1.

Referring to FIG. 2, there is shown programmable bootstrap loader device 28 receiving I/O bus 18. Operating instructions for device 28 and data words are coupled through bus 18 between programmable loader device 28 and minicomputer 12. An operating instruction includes an address for selecting a particular location in alterable memory 34 of the loader device, and further includes a function code specifying a function to be performed thereby. In a very useful implementation of a memory 34, a data word coupled through I/O bus 18 comprises one-half of an instruction included in a bootstrap loader program for computer system 10, memory 34 therefore being capable of storing 128 8-bit data words.

An operating instruction coupled through I/O bus 18 to device 28 from CPU 14 is received by computer I/O control 36, which responds thereto by selectively generating control signals DTIX, DTOX, SYRT-, EXT, and SERX-. DTIX indicates that data is to be read out of alterable memory 34 into main memory 16. DTOX indicates that data is to be written into memory 34. STRT- and EXT are reset and enabling signals, respectively. SERX- is a test signal, coupled to CPU 14 to inform CPU 14 of the operational status of loader device 28.

The function code of an operating instruction coupled to device 28 is received by function decoder 38, which responds thereto by selectively generating control signals SELADR, WRITE, READ, AUTOREAD and SBY. When an SELADR (select address) signal is generated by decoder 38, loader device 28 sets the address lines A₀–A₅ of memory 34 to the address of the operating instruction currently on the I/O bus. When a WRITE (write) control signal is generated by decoder 38, loader device 28 operates to write a data word into memory 34, a data word comprising, as aforementioned, one-half of one of the instructions in a bootstrap loader program. A particular instruction in a bootstrap loader program stored in memory 34 may thereby be readily altered, whereby memory 34 is a programmable memory. When a READ (single read) signal is generated by decoder 38, a single data word is read out of memory 34 into main memory 16, whereby a discrete instruction of a bootstrap program may be readily changed or altered in main memory 16. When an AUTOREAD (automatic read) control signal is generated, all of the 64 instructions comprising a bootstrap loader program stored in memory 34 (and therefore all 128 data words therein) are rapidly and automatically read into main memory 16.

An SBY (standby) signal is generated by decoder 38 when loader device 28 is not in operation.

FIG. 2 also shows the function code received by write select circuit 40 of device 28, which cooperates with load address control 42 and write sequence logic 44 to form a write mode control 46. Write mode control 46 generates signals which, together with signals generated by a read mode control 48, direct the operation of alterable memory address control 50, which receives the address of an operating instruction generated by CPU 14. Address control 50 is coupled to address lines A₀–A₅ of atlerable memory 34 to select discrete storage locations therein.

Write control 46 and read control 48 also generate signals which together control the operation of data I/O control 52 and alterable memory internal control 54. Data control 52 regulates the writing of data into and the reading of data out of selected locations in alterable memory 34. Internal control 54 is coupled to mode lines CA, MC1, and MC2 of memory 34 to direct the internal operation thereof.

When an SELADR (select address) control signal is generated by function decoder 38, load address control 42 is operated to generate an inverted load address signal, LOAD-. The inverted load signal is inputted to memory address control 50, which thereupon selects the location in alterable memory 34 having the address of the operating instruction currently on I/O bus 18. The SELADR function may thereby be used to enable CPU 14 of minicomputer 12 to specify a particular location memory 34.

When function decoder 38 generates a WRITE signal, write select circuit 40 generates an inverted write mode signal, WM-. If computer I/O control 36 is simultaneously generating signal DTOX, write select 40 also provides a write enable signal, WREN, which is coupled to write sequence logic 44, to commence a write operation, or cycle. Write sequence logic 44 receives the clock of computer system 10, SCLK, and provides output signals SWS- (inverted start write sequence), WINC (write increment), RSW (write sequence reset) and timing signals WA-WF.

When decoder 38 generates a READ signal, concurrently with a DTIX signal from I/O control 36, read mode control 48 commences a cycle to read a single data word, or one-half of a bootstrap loader instruction, out of a selected location in memory 34 and into memory 16. At the start of a single read cycle, read mode control 48 generates a read mode signal RM. At the conclusion thereof, control 48 generates an increment address signal RINC. Timing signals RA-RC are sequentially generated during a single read cycle.

When function decoder 38 generates an AUTOREAD signal simultaneously with the generation of DTIX, read mode control 48 commences a cycle to read an entire 64 instruction bootstrap loader program into main memory 16. During an AUTOREAD cycle, read mode control 48 performs 128 single read cycles, alterable memory address control 50 being incremented by one at the end of each such single read cycle.

In order to write data into, or read data out of, memory 34, data I/O control 52, coupled between IO bus 18 and data input/output terminals of memory 34, receives a signal WREN. Data transfer is enabled at the end of a cycle by signals WL- and LD-, coupled to control 52 from alterable memory internal control 54. Internal control 54 is operated by inverted read mode and write mode signals RM- and WM-, respectively, start write sequence signal SWS, reset write sequence RWS, and timing signals WA-WF and RA-RC.

In order to reset respective components of loader device 28, a bootstrap loader reset 56 is shown in FIG. 2, which receives the SBY control signal from decoder 38 and the computer system reset signal SYRT- to provide reset signal SST-.

Figure 3:
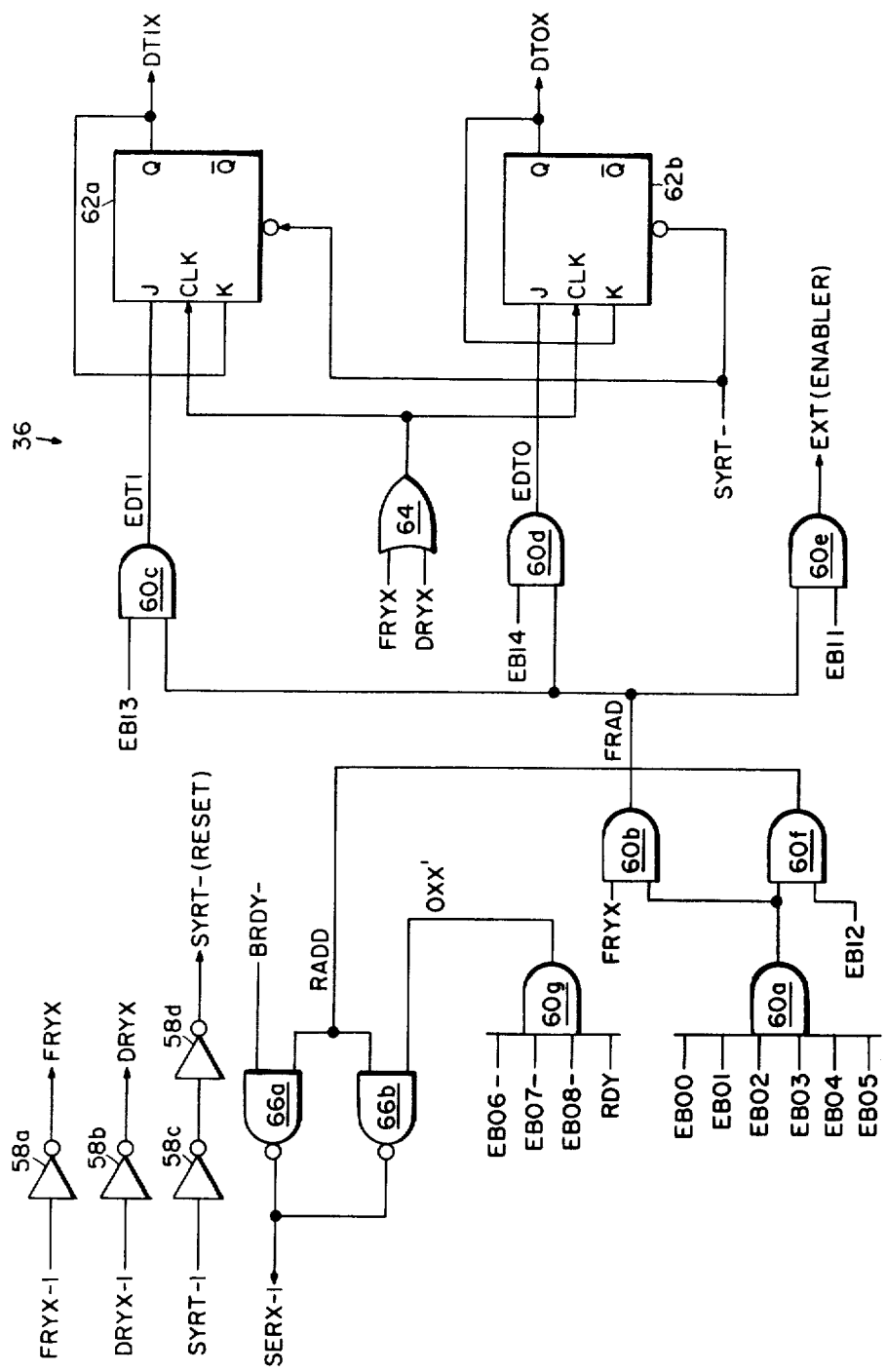
FIG. 3 is a schematic diagram showing a computer I/O control for the embodiment of FIG. 2.

Referring to FIG. 3, there is shown computer I/O control 36 receiving an operating instruction through I/O bus 18, the instruction including bits EB00–EB14. In the instruction format of computer system 10, bits EB00–EB05 are address bits, and bits EB06–EB08 comprise the aforementioned function code. I/O control 36 additionally receives control signals FRYX-I, DRYX-I and SYRT-I, which are respectively coupled through inverters 58a–d to provide signals FYRX, DRYX and SYRT-. SYRT- is employed as a system reset.

Address bits EB00–EB05 comprise the respective inputs to AND gate 60a, and are coupled to AND gate 60b, along with signal FRYX, to provide signal FRAD. FRAD is AND gated with control bit EB13 by means of AND gate 60c, the output thereof being coupled to J-K flip flop 62a to provide control signal DTIX. Signal DTIX is a standard control signal generated by computer system 10 when data is to be read into main memory 16 from a system peripheral device. Similarly, FRAD is AND gated with control bit EB14 by means of AND gate 60d, the output thereof being coupled to J-K flip-flop 62b to provide control signal DTOX. DTOX is the standard control signal generated by computer system 10 or write data into a peripheral from main memory 16. J-K flip flops 62a and b are clocked by control signals FRYX and DRYX, through OR gate 64.

Referring further to FIG. 3, there is shown the output of AND gate 60b and control bit EB11 coupled to AND gate 60e, to provide enabling bit EXT.

When I/O control 36 is in operation, it is necessary to provide notice thereof to CPU 14. Control 36 therefore couples test signal SERX-I to CPU 14 to enable CPU 14 to sense the operational status of loader device 28. The sense instruction is generated by coupling the output of AND gate 60a to AND gate 60f, the other input thereof being control bit EB12. The output of gate 60f is coupled to NAND gates 66a and b, the combined outputs thereof comprising test signal SERX-I. The other input to NAND gate 66a is provided by yhe BRDY- (inverted buffer ready) output of read mode control 48. The other input to NAND gate 66b is provided by the output of AND gate 60g, the inputs thereto comprising the function code EB06-EB08 and the RDY output of alterable memory internal control 54.

Figure 4:
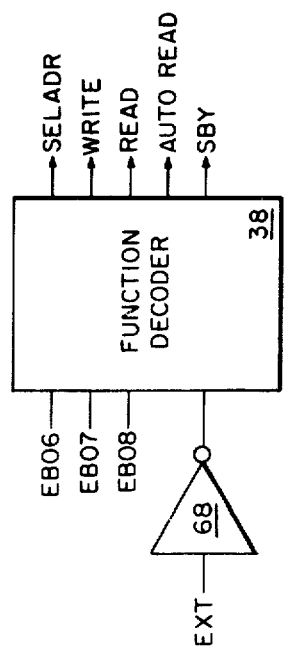
FIG. 4 is a schematic diagram showing a function decoder for the embodiment of FIG. 2.

Referring to FIG. 4, there is shown function decoder 38 receiving function code bits EB06-EB08, together with enabling signal EXT, coupled thereto through an inverter 68. Function decoder 38 usefully comprises a conventional semiconductor decoding device.

Figure 5:
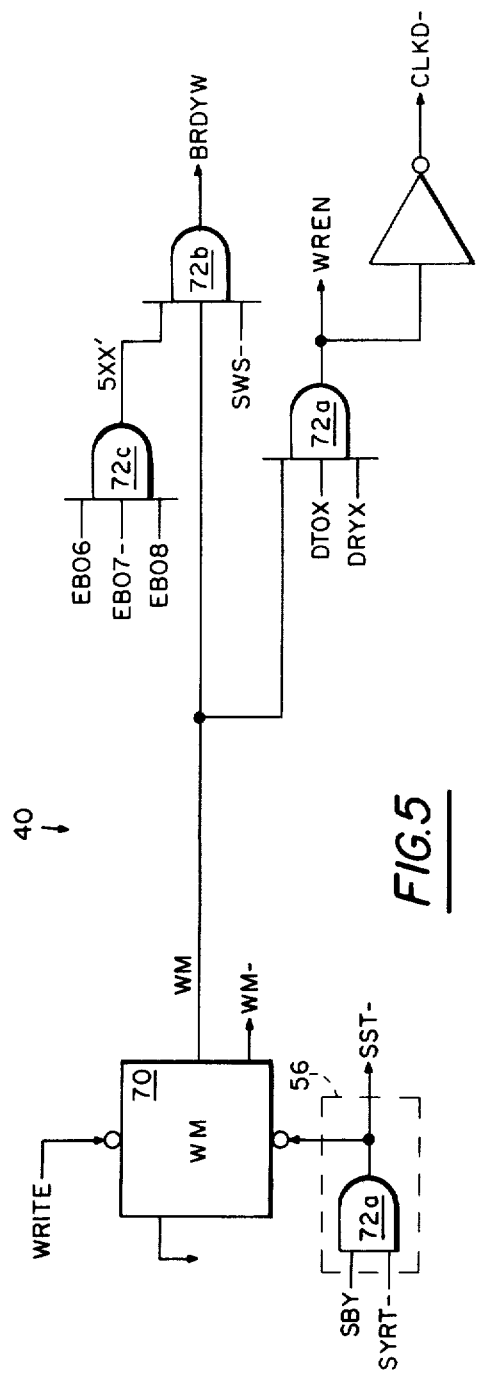
FIG. 5 is a schematic diagram showing a write select circuit for the embodiment of FIG. 2.

Referring to FIG. 5, there is shown write select 40 provided with a write select flip flop 70, which is set by the WRITE control signal from decoder 38. Write select flip flop 70 provides write mode and inverted write mode signals, WM and WM-, respectively, the write mode signal being coupled to AND gate 72a. AND gate 72a also receives signals DTOX and DRYX from I/O control 36 to generate write enable signal WREN. The write mode signal is also coupled to AND gate 72b, the output thereof comprising BRDYW (buffer ready write), which indicates the operational status of write mode control 46. AND gate 72b also receives the SWS- (inverted start write sequence) signal from write sequence logic 44, and the output of AND gate 72c, the inputs thereto comprising the function code bits EB06-EB08.

Referring further to FIG. 5, there is shown write select flip flop 70 being reset by the output of bootstrap loader reset 56. Reset 56 usefully comprises AND gate 72d, the inputs thereto comprising signals SBY and SYRT-, the computer system reset, the output therefrom comprising loader device reset signal SST-.

Figure 6:
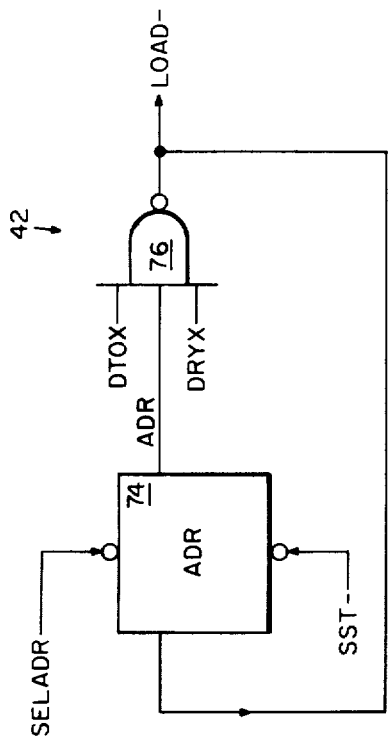
FIG. 6 is a schematic diagram showing a load address control for the embodiment of FIG. 2.

Referring to FIG. 6, there is shown load address control 42 provided with a flip flop 74, which is set by control signal SELADR from decoder 38. Upon being set, the ADR output of flip flop 74 is coupled to an input of NAND gate 76, the other inputs thereto comprising signals DTOX and DRYX of I/O control 36. The output of NAND gate 76 comprises the inverted load address signal, LOAD-. As aforementioned, the LOAD- signal causes alterable memory 34 to be addressed by the address of the operating instruction currently on I/O bus 18. It will be noted that flip flop 74 is reset by signal SST-.

Figure 7:
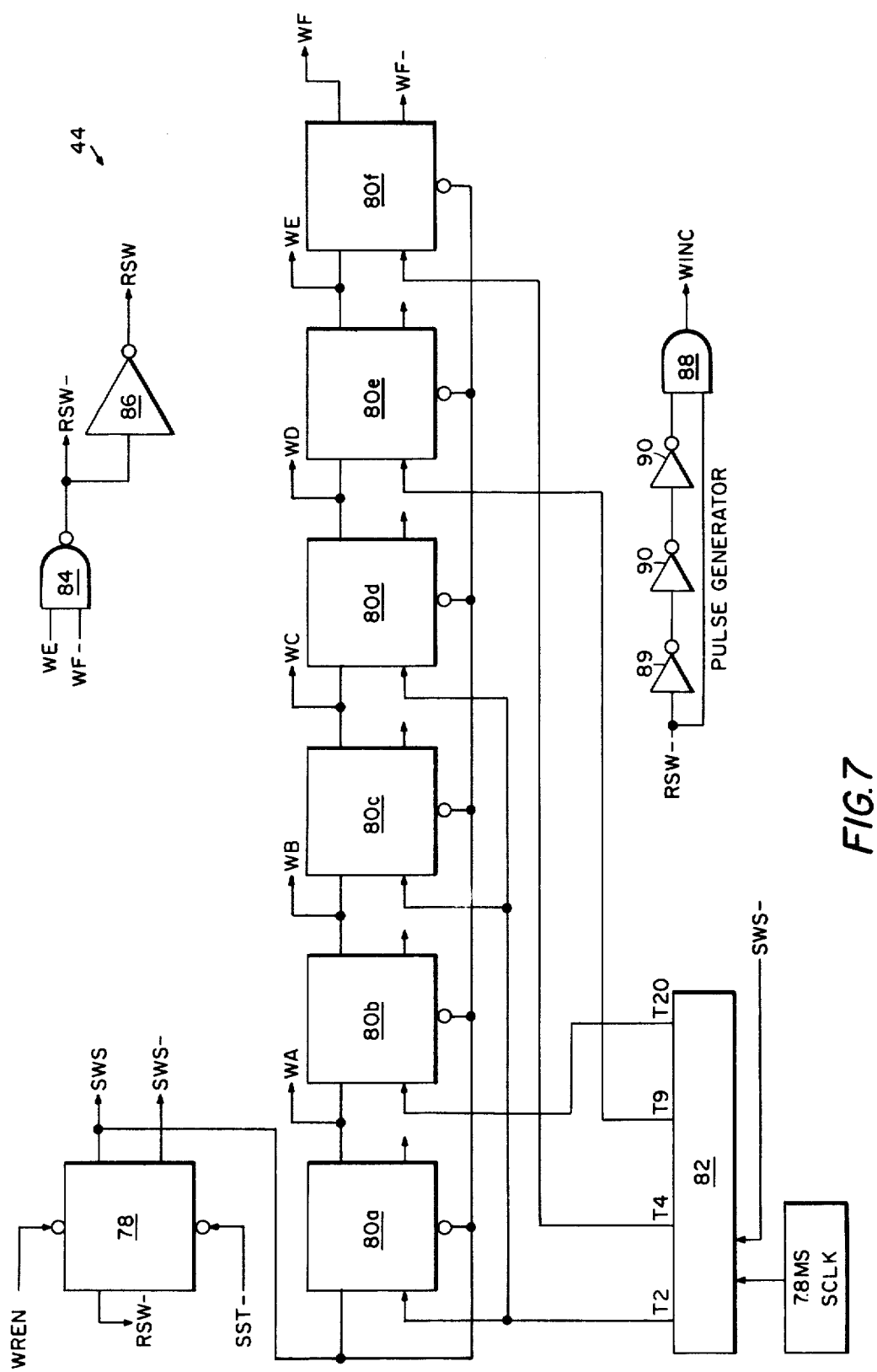
FIG. 7 is a schematic diagram showing write sequence logic for the embodiment of FIG. 2.

Referring to FIG. 7, there is shown write sequence logic 44 provided with write flip flop 78, which is set when a write enable signal is generated by write select 40. Thereupon, flip flop 78 generates an SWS signal, which clears each flip flop in a series of flip flops 80a-f and enables flip-flop 80a. The outputs of flip flops 80a-f comprise timing signals WA-WF, respectively, which are coupled to memory internal control 54 in order to regulate the timing of alterable memory 34 during a write cycle. FIG. 7 shows each flip-flop 80b-80f enabled by the output of the flip-flop immediately to its left.

It has been found that for an alterable memory 34 which comprises a configuration of conventional devices, hereinafter described, internal control 54, also described hereinafter, properly operates memory 34 to write a data word thereinto if signals WA-WF occur in a particular timed sequence during a write cycle. Such sequence is provided by clocking flip-flops 80a-80f by means of selected outputs of a conventional counter 82, which is stepped by 7.8μ second clock pulses of the system clock (SCLK). The T2 output of counter 82, comprising a 31 microsecond clock, is coupled to the clock terminals of flip flops 80a, 80c and 80d. Output T20 of counter 82, comprising a two second clock, is coupled to the clock terminal of flip flop 80b. Output T9, comprising a two millisecond clock, is coupled to the clock terminal of flip flop 80e, and output T4, a 31 microsecond clock, is coupled to the clock terminal of flip flop 80f. Consequently, 15.6 microseconds after the SWS signal is generated, timing signal WA occurs, which also enables flip flop 80b. Two seconds thereafter, timing signal WB occurs, enabling flip flop 80c. In like manner, timing signal WC occurs 15.6 microseconds after signal WB, WD occurs 15.6 microseconds after WC, WE occurs two milliseconds after WD, and signal WF occurs 31 microseconds after signal WE.

To conclude a write cycle, the output of flip flop 80e, WE, and the inverted output of flip flop 80f, WF-, are coupled to NAND gate 84. When WF goes high, signal RSW- (inverted reset write) is generated, which is coupled to write flip flop 78, generating SWS- to clear counter 82. RSW- is also coupled directly to an input of AND gate 88, and also to another input thereof through inverters 90, to generate a write increment pulse WINC.

Flip flop 78 is reset by reset signal SST-.

Figure 8:
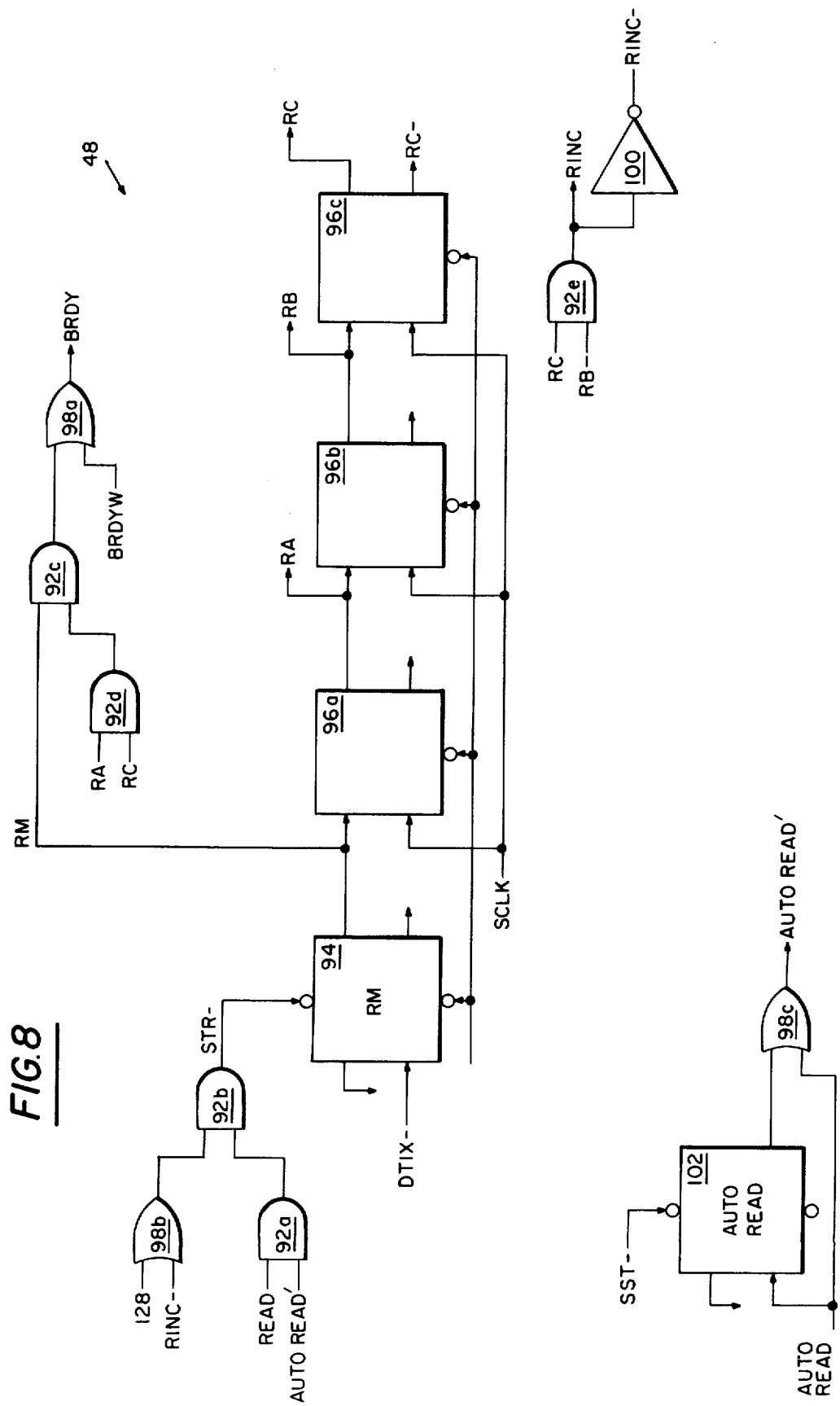
FIG. 8 is a schematic diagram showing a read mode control for the embodiment of FIG. 2.

Referring to FIG. 8, there is shown read mode control 48 provided with read flip flop 94, which is set when a READ control signal is generated by decoder 38, such READ signal being coupled to flip flop 94 through AND gates 92a and b. Upon being set, flip flop 94 provides a read mode signal RM, which enables flip flop 96a in a series of flip flops 96a-c. The outputs of flip flops 96a-c comprise timing signals RA-RC, respectively, which are coupled to memory internal control 54 in order to regulate the timing of alterable memory 34 during a single read cycle. FIG. 8 shows flip flop 96b enabled by timing signal RA, and further shows flip flop 96c enabled by timing signal RB.

It has been found that to enable internal control 54 to properly operate memory 34 to read a data word there out of and into main memory 16, it is necessary to sequentially generate timing signals $R_a$-$R_c$ at regular intervals, which may be 7.8 microseconds. This is simply achieved by clocking each of the flip flops 96a-c by means of system clock SCLK.

In order to coordinate the operation of bootstrap loader device 28 during a read cycle with the operation of minicomputer 12, read flip flop 94 is clocked by control signal DTIX, and read mode signal RM is employed to generate signal BRDY (buffer ready). Signal RM is coupled to AND gate 92c, the other input thereto comprising the output of AND gate 92d, which in turn receives timing signals RA and RC. The output of AND gate 92c is coupled to OR gate 98a, together with BRDYW, (write buffer ready), which indicates the operational status of write mode control 46.

Timing signal RC and inverted timing signal RB- are coupled to AND gate 92e to provide a read increment signal RINC, and an inverted read increment signal RINC- through inverter 100.

Referring further to FIG. 8, there is shown an automatic read flip flop 102, which is clocked by control signal AUTOREAD from function decoder 38, causing signal AUTOREAD' to be generated, through OR gate 98c. AUTOREAD' signal is coupled to AND gate 92a, and RINC- is coupled to OR gate 98b. The other input to OR gate 98b comprises the number 128, in selected coded form. Consequently, when read mode control 48 receives an AUTOREAD signal from decoder 38, it is caused to operate through 128 single read cycles. All 64 instructions, or 128 data words comprising a bootstrap loader program stored in memory 34, are thereupon read out of memory 34 and into main memory 16.

Figure 9:
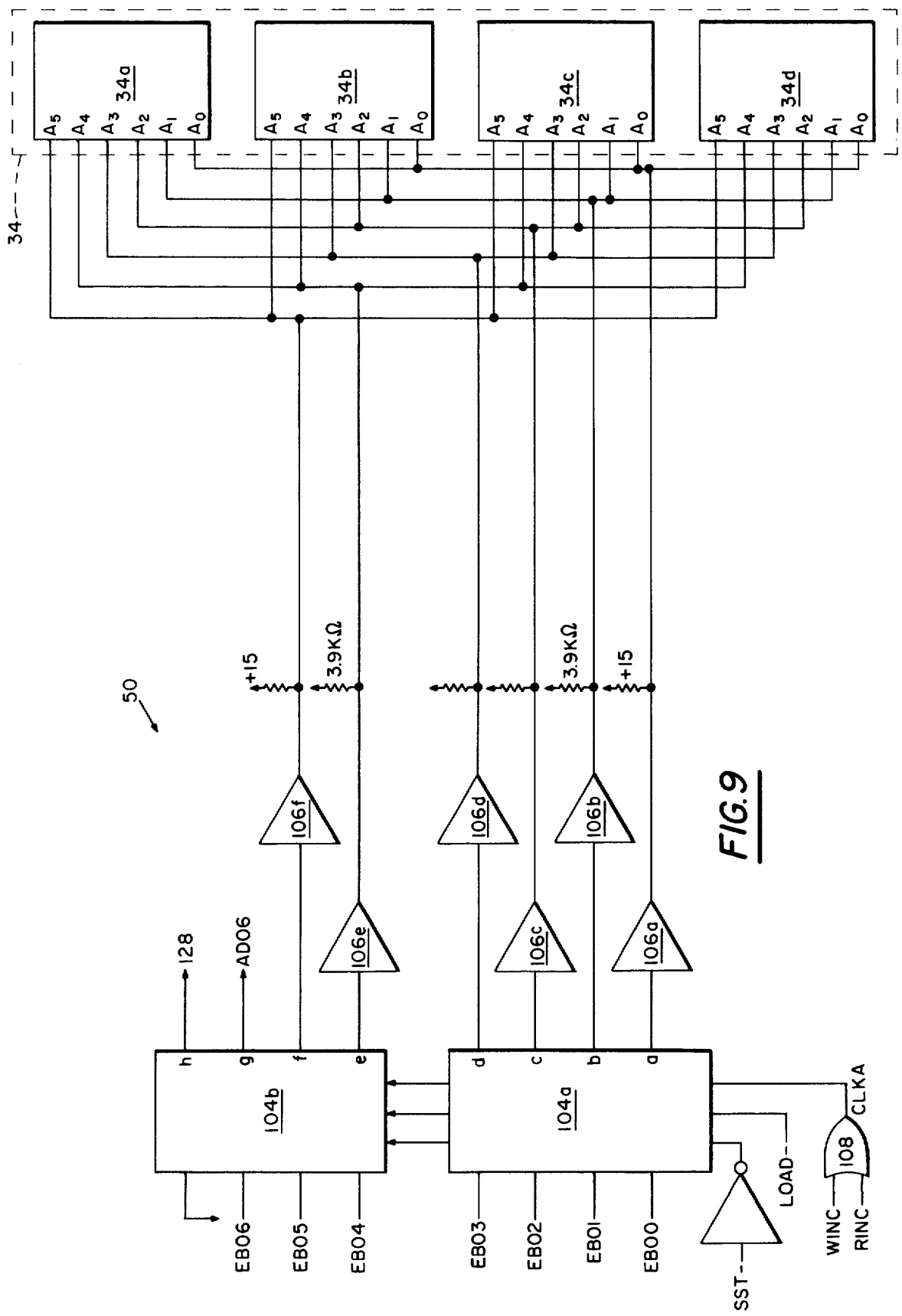
FIG. 9 is a schematic diagram showing alterable non-volatile ROM elements $M_1$-$M_4$, which together comprise the alterable memory of the embodiment of FIG. 2, FIG. 9 further showing an alterable memory address control for the embodiment of FIG. 2.

Referring to FIG. 9, there is shown alterable memory 34 comprising four alterable memory elements 34a–d, each having six address terminals $A_0$–$A_5$. Each memory element usefully comprises an electrically alterable nonvolatile MNOS memory array, which is manufactured by Nitron, a Division of McDonnell Douglas Corporation, and which is designated thereby as the NC 7040. Various operating characteristics of the NC 7040, and the basic structure thereof, is disclosed in a brochure which was copyrighted by Nitron in 1977 and printed in the U.S.A. in 8/77. By interconnecting four such alterable non-volatile memories, sufficient storage space is provided for all 128 of the data words which together comprise a bootstrap loader program for minicomputer 12.

Referring further to FIG. 9, there are shown bits EB00–EB-6 received by address control 50, bits EB0-0–03 being coupled to an address counter register 104a and bits EB04–06 being coupled to an address counter register 104b. Outputs a–d of register 104a are respectively coupled to the address terminals $A_0$–$A_3$ of each of the alterable memory elements, through inverters 106a–106d. Output terminals e and f of register 104b are respectively coupled to address terminals $A_4$ and $A_5$ of the memory elements, through inverters 106e and 106f.

When the LOAD- signal, the output of load address control 42, is applied to counters 104a–b, the address bits EB00–5 currently on I/O bus 18 are respectively passed through registers 104a and b to output terminals a-f thereof, whereby the address currently on bus 18 is applied to address terminals $A_0$–$A_5$ of the alterable memory elements.

When either a WINC signal occurs at the end of a write signal, or an RINC signal occurs at the end of a single read signal, registers 104a–b are incremented by one, through OR gate 108. Consequently, at the conclusion of a write cycle or a single read cycle, the address coupled to the address terminals of alterable memory 34 is increased by one.

Referring further to FIG. 9, there is shown function code bit EB06 coupled to register 104b such that bit EB06 may be selectively coupled through register 104b to provide signal AD06 on the g output terminal thereof. Signal AD06 is coupled to alterable memory internal control 54 to selectively enable data transfer from minicomputer 12 to either memory elements 34a and b or 34c and d. The h terminal of register 104b is selected so that output h goes high upon the 128th increment of registers 104a–b. Output terminal h therefore provides the signal required to conclude an automatic read cycle of read mode control 48.

Figure 10:
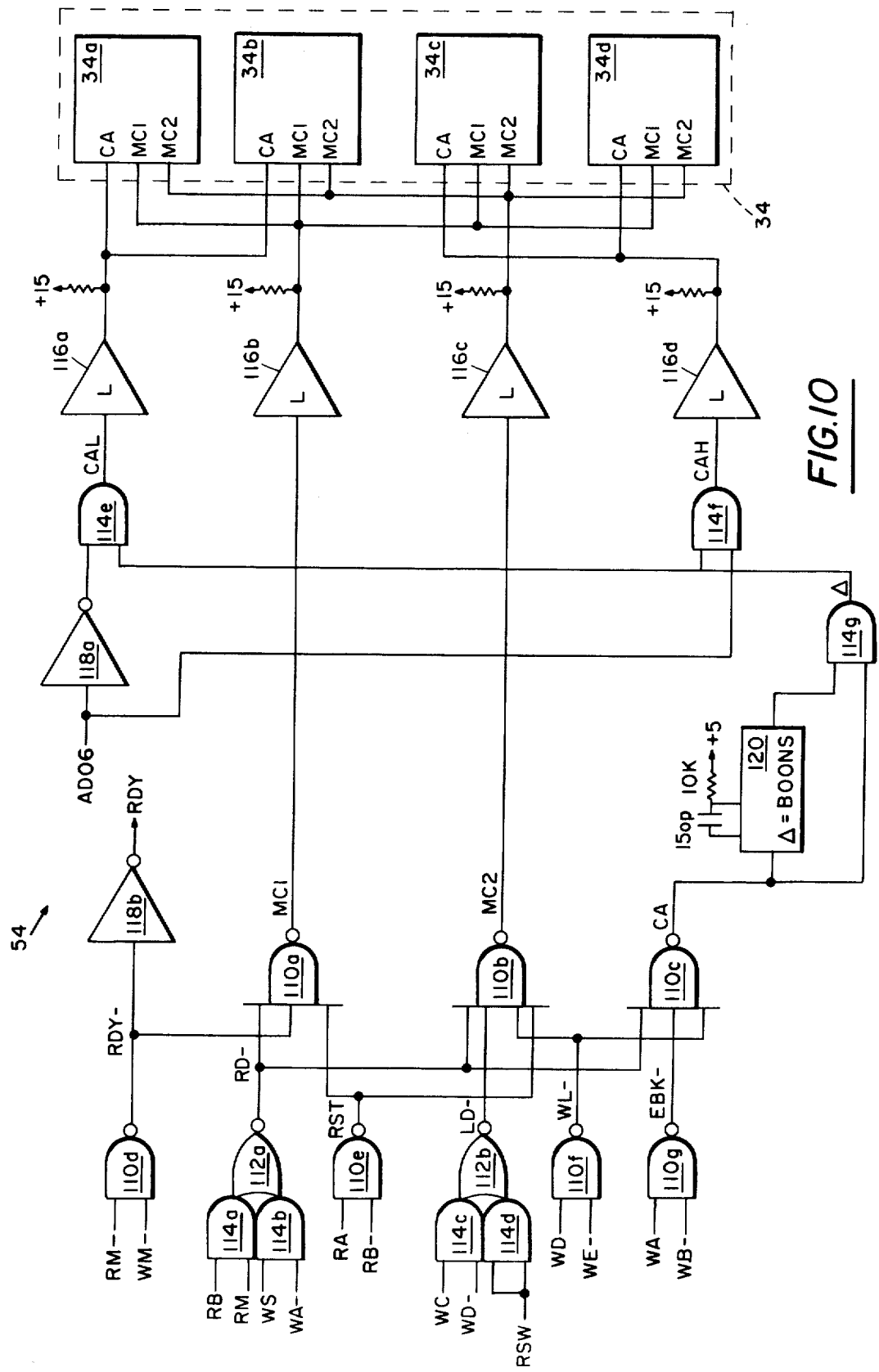
FIG. 10 is a schematic diagram showing alterable ROM elements $M_1$-$M_4$ and an alterable memory internal control for the embodiment of FIG. 2.

Referring to FIG. 10, there is shown alterable memory internal control 54 comprising a configuration of NAND gates 110a–g, NOR gates 112a–b, AND gates 114a–g, level shifters 116a–d, inverters 118a–b, and an 800 nanosecond delay 120. Such elements are interconnected as shown in FIG. 10, and receive various control and timing signals from other components of bootstrap loader device 28 to selectively operate each alterable memory element 34a–d. Each alterable memory element includes a mode decoder having three control inputs, mode control 1 (MC1), mode control 2 (MC2) and chip access (CA). Signals are coupled to the MC1 input of each memory element from NAND gate 110a, and signals are coupled to the MC2 mode control of each memory element from NAND gate 110b, through level shifters 116a–d, respectively.

The output of NAND gate 110c is coupled through AND gate 114g to AND gate 114e, the other input to gate 114e comprising the inversion of signal AD06. The output of gate 114e comprises CAL (chip access low), which is coupled to memory elements 34a and b. The output of NAND gate 110c is also coupled to AND gate 114f, the other input thereto comprising signal AD06 to provide CAH (chip access high), coupled to memory elements 34c and 34d. CAL enables elements 34a and b to store data, and CAH enables elements 34c and d to store data.

Referring further to FIG. 10, there are shown inverted read mode and write mode signals RM- and WM-providing the inputs to NAND gate 110d, to generate a RDY signal, the output of inverter 118b. Internal control 54 also provides signals LD-, the output of NOR gate 112b, and WL-, the output of NAND gate 110f.

Figure 11:
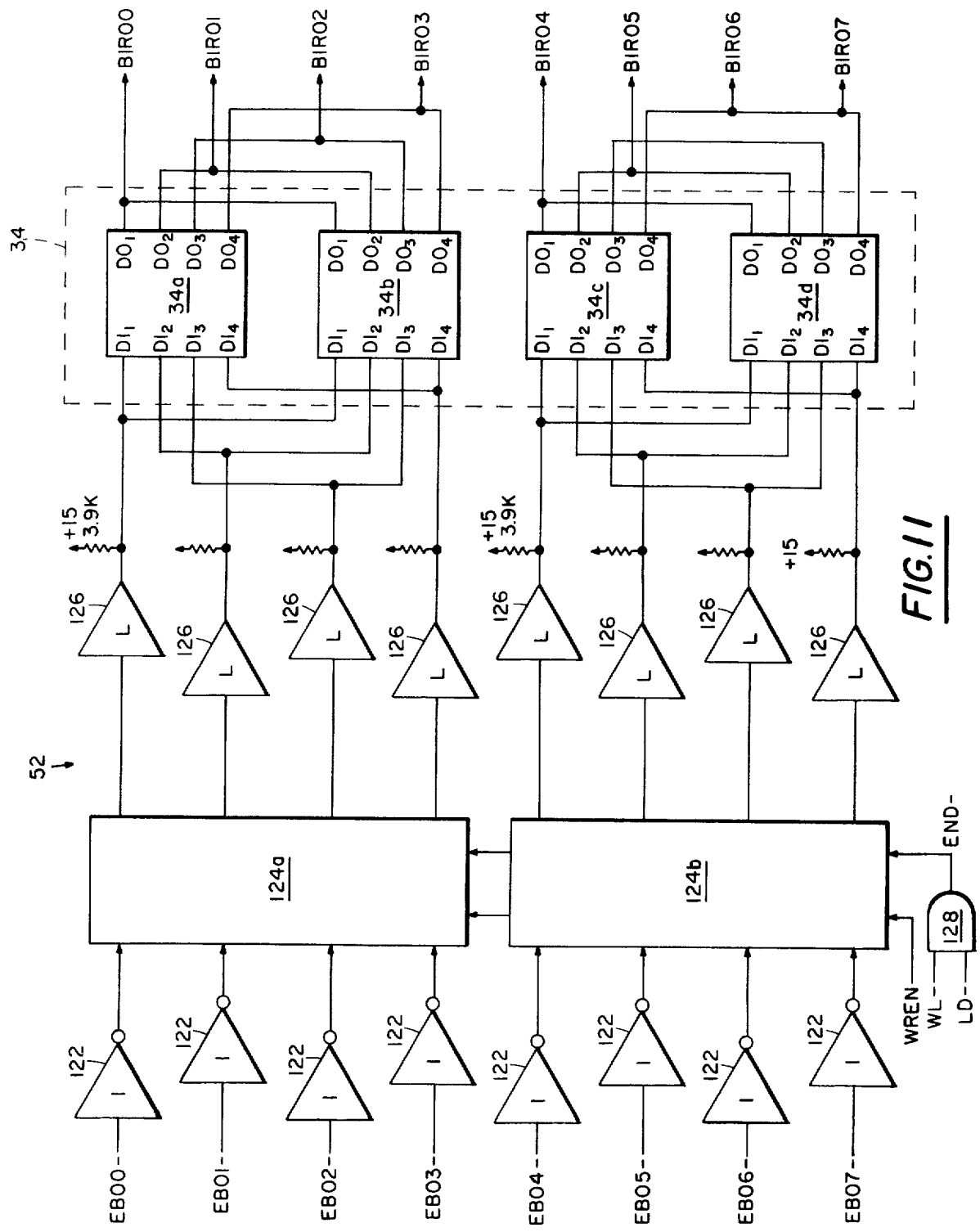
FIG. 11 is a schematic diagram showing alterable ROM elements $M_1$-$M_4$ and an alterable memory data control for the embodiment of FIG. 2.

Referring to FIG. 11, there is shown data control 52 capable of receiving an 8-bit data word, when data bits EB00-7 are on I/O bus 18. The data bits are inverted by respective inverters 122, are presented to input registers 124a–b and are latched thereinto by a write enable signal WREN. Signals WL- and LD- are coupled to AND gate 128 to provide an END- signal. When an END- signal is generated, data bits EB00–3 are respectively coupled to data input terminals $DI_1$–$DI_4$ of memory elements 34a and c, and data bits EB04–7 are respectively coupled to input terminals $DI_1$–$DI_4$ of elements 34b–d, through level shifters 126. Data bits EB00–7 are shifted into memory elements 34a and b when CAL is present, and into memory elements 34c and d when CAH is present.

Referring further to FIG. 11, there are shown data bits BIR00–7 comprising an 8-bit data word which is present on I/O bus 18 during a single read cycle. When CAL is present, data bits BIR00–7 comprise the respective data outputs $DO_1$–$DO_4$ of memory elements 34a and b. Similarly, when CAH is present, data bits BIR0-0–7 comprise the respective outputs $DO_1$–$DO_4$ of elements 34c and d.

Obviously many modifications and variations of the present invention are possible in the light of the above teachings, and it is therefore understood that within the scope of the disclosed inventive concept the invention may be practiced otherwise than as specifically described.

What is claimed is:

1. A programmable bootstrap loader apparatus for loading software into the main memory of a computer system having an interconnected processor comprising:
   nonvolatile storage memory means coupled to the main memory and having an electrically repeatedly alterable firmware structure for storing a set of instructions forming a bootstrap loader program that is not lost when power to the system is lost, said nonvolatile storage alterable memory means includes firmware means for providing a selected number of addressable data storage locations, and for enabling data storage at a particular one of said addressable locations to be selectively altered, while preventing loss of stored data when electric power is cut off from the alterable memory means;
   computer processor-peripheral interface means coupled to the main memory for decoding instructions of said computer system, and for generating peripheral control signals; and alterable memory access means coupled to said processor, to said processor-peripheral interface means to receive the peripheral control signals and to said nonvolatile storage memory means for selectively altering discrete instructions of said stored bootstrap loader program in response to a discrete instruction provided by the processor and the peripheral control signals provided by the processor-peripheral interface means, said alterable memory access means further includes means for transferring a plurality of instructions including said bootstrap loader program from said alterable memory means into said main memory in response to a single instruction provided by said processor.

2. The apparatus of claim 1 wherein said alterable memory access means comprises:

write mode control means for establishing a write cycle, and for generating write control signals during said write cycle;

read mode control means for establishing a read cycle, and for generating read control signals dsuring said read cycle;

means responsive to said write and read control signals for addressing one of said data storage locations of said alterable memory means during each of said write and read cycles;

means responsive to said write and read control signals for shifting a mode level of said alterable memory means during each of said write and read cycles; and bus means coupled to the write mode control means, the read mode control means, the addressing means and the regulating means and coupling them to the processor and the interface means responsive to said write and read control signals for enabling data to be transferred into or out of one of said storage locations of said alterable memory means during each of said write and read cycles.

3. The apparatus of claim 2 wherein:

said computer processor-peripheral interface means includes a decoding means coupled to the processor for selectively signalling said read mode control means to establish a selected number of sequential read cycles and said write mode control means to establish a selected number of sequential write cycles; and said read mode control means includes means for changing the storage content addressed by said addressing means at the conclusion of each said sequential write cycles.

4. The apparatus of claim 3 wherein:

said read mode control means includes means for incrementing an address provided by said addressing means at the conclusion of each of said sequential read cycles:

said write mode control means comprises means for coupling a sequence of timing signals to said memory internal operation regulating means during each of said write cycles.

* * * * *